(12) United States Patent
Cousin et al.

(10) Patent No.: US 11,835,842 B2
(45) Date of Patent: Dec. 5, 2023

(54) PROCESSOR-CONTROLLED HIGH HARMONIC OPTIMIZATION WITH OPTIMAL GAS HANDLING

(71) Applicant: KAPTEYN MURNANE LABORATORIES, INC., Boulder, CO (US)

(72) Inventors: Seth Lucien Cousin, Boulder, CO (US); Michael Tanksalvala, Longmont, CO (US); Henry C Kapteyn, Boulder, CO (US)

(73) Assignee: Regents of the Univ of Colorado, a body corporate, Denver, CO (US)

( * ) Notice: Subject to any disclaimer, the term of this patent is extended or adjusted under 35 U.S.C. 154(b) by 15 days.

(21) Appl. No.: 17/603,233

(22) PCT Filed: Apr. 13, 2020

(86) PCT No.: PCT/US2020/027908
§ 371 (c)(1),
(2) Date: Oct. 12, 2021

(87) PCT Pub. No.: WO2020/210787
PCT Pub. Date: Oct. 15, 2020

(65) Prior Publication Data
US 2022/0187679 A1    Jun. 16, 2022

Related U.S. Application Data

(60) Provisional application No. 62/833,080, filed on Apr. 12, 2019.

(51) Int. Cl.
*G02F 1/35* (2006.01)
*G02B 27/28* (2006.01)
(Continued)

(52) U.S. Cl.
CPC ......... *G02F 1/3503* (2021.01); *G02B 27/281* (2013.01); *G02F 1/353* (2013.01);
(Continued)

(58) Field of Classification Search
CPC ..... G02B 27/281; G02F 1/3503; G02F 1/353; G02F 1/354; G02F 1/3555; G02F 1/365;
(Continued)

(56) References Cited

U.S. PATENT DOCUMENTS 9,160,137 B1 * 10/2015 Abdolvand ........... H01S 3/0092
10,128,631 B2 * 11/2018 Popmintchev ............ H01S 4/00
(Continued)

FOREIGN PATENT DOCUMENTS

JP          6722761 B2 *  7/2020    ......... G02B 27/0927

*Primary Examiner* — Daniel Petkovsek
(74) *Attorney, Agent, or Firm* — Macheledt Bales LLP; Jennifer L. Bales

(57) ABSTRACT

Apparatus and methods for improved HHG of ultrashort pulse laser beams. A HHG assembly includes a gas distribution block and a waveguide cartridge having a HHG hollow core waveguide. The waveguide cartridge is attached to the gas distribution block and may be removed and replaced, while the gas distribution block remains affixed within the apparatus. The gas distribution block is configured to maintain a pressure profile within the hollow core fiber. The system also includes two operating beam sensors and two actuatable mirrors. The operating beam sensors are fixed with respect to the HHG assembly. The system is aligned before operation by adjusting the actuatable mirrors to optimize a sample beam through the waveguide and recording the position of the beam on the operating beam sensors. In operation, the mirrors are actuated to maintain the same positions of the input beam on the operating beam sensors.

17 Claims, 7 Drawing Sheets

(51) Int. Cl.
  *G02F 1/355*    (2006.01)
  *G02F 1/365*    (2006.01)
(52) U.S. Cl.
  CPC ............ *G02F 1/354* (2021.01); *G02F 1/3555* (2013.01); *G02F 1/365* (2013.01); *G02F 2201/02* (2013.01); *G02F 2201/58* (2013.01); *G02F 2203/07* (2013.01); *G02F 2203/48* (2013.01)
(58) Field of Classification Search
  CPC ............ G02F 2201/02; G02F 2201/58; G02F 2203/07; G02F 2203/48
  See application file for complete search history.

(56) References Cited

U.S. PATENT DOCUMENTS

| | | | |
|---|---|---|---|
| 10,663,397 B2* | 5/2020 | Peng | ........................ H01S 1/02 |
| 11,360,396 B2* | 6/2022 | Bauerschmidt | .... G02B 6/02309 |
| 2014/0085623 A1* | 3/2014 | Lorbeer | ............ G01N 21/4795 |
| | | | 356/51 |
| 2017/0184981 A1* | 6/2017 | Quintanilha | ........ G03F 7/70633 |
| 2017/0222393 A1* | 8/2017 | Popmintchev | ........ G02F 1/3544 |
| 2018/0254597 A1* | 9/2018 | Van Der Post | ..... H01L 21/2636 |

* cited by examiner

PROCESSOR-CONTROLLED HIGH HARMONIC OPTIMIZATION WITH OPTIMAL GAS HANDLING

BACKGROUND OF THE INVENTION

This invention was made with government support under grant number W31P4Q-17-C-0104 awarded by DARPA and grant number DMR 1548924 awarded by STROBE. The government has certain rights in the invention.

FIELD OF THE INVENTION

The present invention relates to apparatus and methods for high harmonic generation (HHG) optimization. In particular, this invention relates to processor-controlled HHG optimization including gas handling and automatic position and orientation control.

DISCUSSION OF RELATED ART

High harmonic generation (HHG) is a process whereby intense, ultra-fast laser pulses interact with matter. As a result of the interaction, new frequencies/wavelengths of light can be created at a harmonic frequency of the driving laser frequencies. HHG can occur in various phases of media (gas, solid and plasma driven high harmonics have been demonstrated), however gas-phase HHG is currently the most prevalent. In gas-phase HHG various target geometries have been used, including free-space gas-jet, semi-infinite gas cell and capillary/fiber geometries, the latter of which offers the most flexibility and usability when it comes to phase-matching the HHG process across a broad range of photon energies/wavelengths. Ultrashort pulses suitable for high harmonic generation are generally in the femtosecond range, usually well under 100 femtoseconds.

The coupling of laser light into a hollow-core fiber waveguide has been extensively studied and the physics behind optimal coupling is well understood. Using a fiber to confine the laser light in a length-customizable, pressure-controlled gaseous interaction region to generate high harmonics is hence a very sensible way to easily and repeatably achieve the control parameters required for bright, phase-matched HHG. Furthermore, owing to the typically required small diameter fibers, gas usage in the apparatus is minimized. Paramount to using the fiber geometry for HHG is the requirement to obtain and then maintain optimal coupling of the laser light into the fiber.

The laser/gas interaction that results in HHG, poses a challenging problem when dealing with the contrasting gas density requirements. These are that the gas density is high in the interaction region, and approaches zero outside of the interaction region. Ideally, the pressure in the interaction region would be on the order of 100 times the pressure in the non-interaction region, depending on the gas used and the configuration. Excess gas before the interaction region can influence the stability of the HHG process, via undesired non-linear interaction between the laser pulses and the gas. Excess gas after the interaction can re-absorb the high-harmonic radiation, reducing the flux available to the experiment. Furthermore, the stability of the HHG process can be detrimentally affected by the propagation of the laser beam, emanating from the laser system, travelling through air to the HHG system. Calculations of the non-linear phase accrued by laser pulses during this propagation for a >1 mJ, tens-of-femtosecond level pulse facilitate the onset of unwanted non-linear effects. The eXtreme Ultraviolet Ultrafast Source (XUUS) is KM Labs' implementation of a high harmonic conversion platform. It is currently in its 4th generation of engineered platform. A fiber based HHG cartridge is at the heart of the XUUS.

The basic premise of XUUS alignment is to co-align a laser beam and a hollow-core fiber. The existing XUUS design relies on two sub-systems to facilitate alignment of the IR beam into the high harmonic generation fiber and subsequent optimization of the high harmonic signal. The first sub-system (S1) is a beam pointing stabilization system called point-lock which aligns the beam to a pre-set reference. The second sub-system (S2), consists of manual vertical and horizontal translation stages at each end of the HHG cartridge, which allows fine tuning of the alignment of HHG fiber with respect to the IR beam.

In past devices, the mechanical alignment of the fiber to the beam necessitates (spring-loaded) translation stages of S2 that introduce a potential source of instability. Furthermore, the requirement for mechanically moving the positioning of the waveguide also seriously limits other desirable capabilities, such as the ability to keep the waveguide cool to avoid thermal expansion instabilities and damage, and the capacity for optimizing differential pumping in the system to make the gas-to-vacuum transition as abrupt as possible to avoid re-absorbing high harmonic light generated. Important to any geometry of HHG, maintaining constant incident laser power is essential.

A need remains in the art for apparatus and methods for improved high harmonic generation (HHG).

SUMMARY OF THE INVENTION

It is an object of the present invention to provide apparatus and methods for improved HHG of ultrashort pulse laser beams. In this invention, we present a significant improvement over prior art HHG systems. Specifically, the present invention no longer requires two subsystems—one for beam stabilization and one for aligning the hollow waveguide to the beam. The present invention uses a combined beam stabilization and alignment.

A polarization-based attenuation system may be used to stabilize the incident laser power, and can also be used to attenuate the incident beam during coarse alignment. The invention achieves the same final goal of an optimally aligned HHG fiber, but does so without the need for S2 and instead relies on improvements/modifications to S1. The mounting in which the hollow waveguide resides is no longer restricted in weight or geometry, making it feasible to implement robust cooling of the waveguide, increasing the average power capability.

Additionally, manufacturing changes of the HHG cartridge facilitate improved tolerancing and hence HHG cartridge placement replicability, which is important for a fixed fiber cartridge system. This also means that, after replacement of a hollow-waveguide "cartridge," the beam of high harmonics emerges from the same point in space, facilitating continued operation after replacement of a waveguide, without the need to physically realign the system.

Furthermore, with processor control of the alignment system, an additional algorithm is used to optimize the high harmonic output. Incident laser power is controlled through a fluence measurement in S1 and power manipulation via polarization control.

To address the gas handling properties of the system, the HHG cartridge design makes use of two concepts to optimize the out-flow of gas. 1) Maximization of aperture diameter from which gas is removed from the cartridge. 2)

Differential pumping apertures to further optimize the outflow of gas. Integration of one or more of the differential pumping apertures with the mounting of the waveguide itself (the "cartridge") allows for rapid swapping of the waveguide while maintaining optimal differential pumping and alignment.

To mitigate the stability-related problems caused by the interaction of a high intensity pulse interacting with air, two aspects of the invention are employed: 1) Calculate and use a "safe" beam size, based upon the beam size, pulse duration and pulse energy. (Safe is defined as the ability to propagate for ~1-3 m in air with the B-integral remaining <~1). Propagate the large beam as needed, until reaching the required focusing optic. 2) Deliver the focusing beam to the HHG target in a vacuum environment.

Apparatus according to the present invention includes a polarized ultrashort pulse laser source, an HHG assembly comprising a gas distribution block and a waveguide cartridge having a HHG hollow core waveguide, the waveguide cartridge removeably attached to the gas distribution block, and the gas distribution block configured to maintain a pressure profile within the hollow core fiber, two operating beam sensors, two actuatable mirrors, and a processor configured to communicate with the operating beam sensors and automatically and repeatedly adjust the actuatable mirrors while the apparatus is operating such that a beam from the ultrashort pulse laser source is directed into the hollow core fiber. The HHG assembly is fixed in place with respect to the two operating beam sensors.

An initial alignment process prior to operation uses an initial alignment sensor at an output of the waveguide to sense a sample beam exiting the waveguide. The power of the input beam is turned down so that HHG does not occur. Therefore the sample beam looks much like the input beam. Then, the actuatable mirrors are adjusted to optimize the sample beam. Next, the power of the input beam is turned up so that HHG initiates. Again the actuatable mirrors are adjusted to optimize the beam out of the waveguide (now an HHG beam). The positions of the sample beam on the two operating beam sensors is recorded. These recorded positions are used in operation, when the actuatable mirrors are adjusted so that the operating positions of the beam on the operating beam sensors converges with the recorded positions.

The gas distribution block is configured to provide a pressure profile within the waveguide wherein the pressure in an interaction region of the fiber is on the order of 100 times the pressure in a noninteraction region of the fiber. The gas distribution block and the waveguide cartridge are held in position with respect to each other using a mechanical registration mechanism. The gas distribution block includes channels configured to cool the waveguide with fluid.

In some embodiments the apparatus includes a polarizing mechanism controlled by the processor and configured to attenuate the beam from the ultrashort pulse laser source. In some embodiments, a series of folding mirrors is disposed optically between the two actuatable mirrors and a focusing element is disposed optically after the actuating mirrors and the folding mirrors. As a feature, a vacuum chamber may be configured to contain the actuatable mirrors and the folding mirrors. Or, the beam from the ultrashort pulse laser source may be configured to have a larger cross section before the actuating mirrors and the folding mirrors and a smaller cross section after the focusing element.

DETAILED DESCRIPTION OF THE INVENTION

TABLE 1

| Ref. no. | Element |
| --- | --- |
| 100 | HHG system - initial adjustment configuration |
| 101, 102, 302, 303, 402, 403 | Actuatable mirrors |
| 103, 201, 312, 412 | Fixed HHG fiber cartridge |
| 104 | Processor |
| 105, 301, 401 | Laser input beam |
| 106, 107 | Operating beam sensors |
| 108, 114, 308, 408 | Beam splitter mirror |
| 109A, B | Initial alignment sensors |
| 110A, B | Initial adjustment beams |
| 111 | Waveplate |
| 112 | Polarizing element |
| 113, 304, 404 | Focusing optic |
| 114 | Sampling mirror |
| 120 | Light into fiber |
| 122, 322, 422 | Sampled monitored light |
| 307, 309, 311, 411, 407, 409 | Mirror |
| 200 | HHG assembly |
| 202 | Gas distribution block |
| 203 | Gas outlet channel |
| 204 | Gas inlet channel |
| 205 | Water cooling channels |
| 206 | HHG hollow core fiber waveguide |
| 207 | Differential pumping chambers |
| 208 | Aperture channels |
| 209 | Registration pin locators |
| 210 | Baseplate |
| 212 | Fiber gas inlet |
| 213 | Fiber gas outlet |
| 300, 400 | HHG subsystem - operating |
| 305, 310, 405, 410 | Window |
| 306, 406 | Vacuum chamber |
| 313, 413 | Output to vacuum beamline |
| 314, 414 | HHG Beam in operation |
| 315, 414 | Folding mirrors |

Table 1 shows elements of the present invention and their associated reference numbers.

Figure 1:
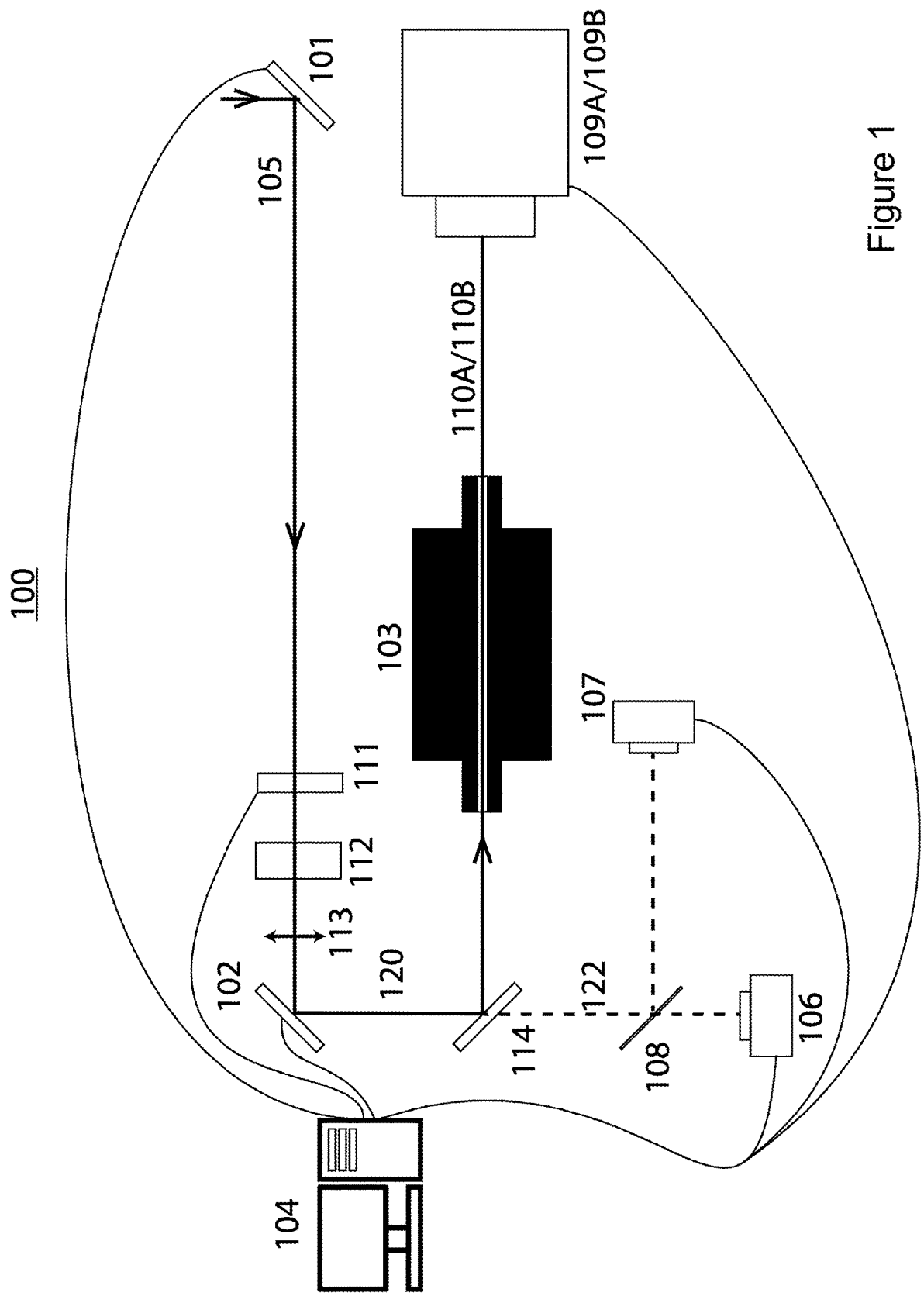
FIG. 1 is a schematic block diagram of an HHG system including a fixed HHG fiber cartridge according to the present invention, configured for initial alignment and/or HHG alignment.
Figure 2:
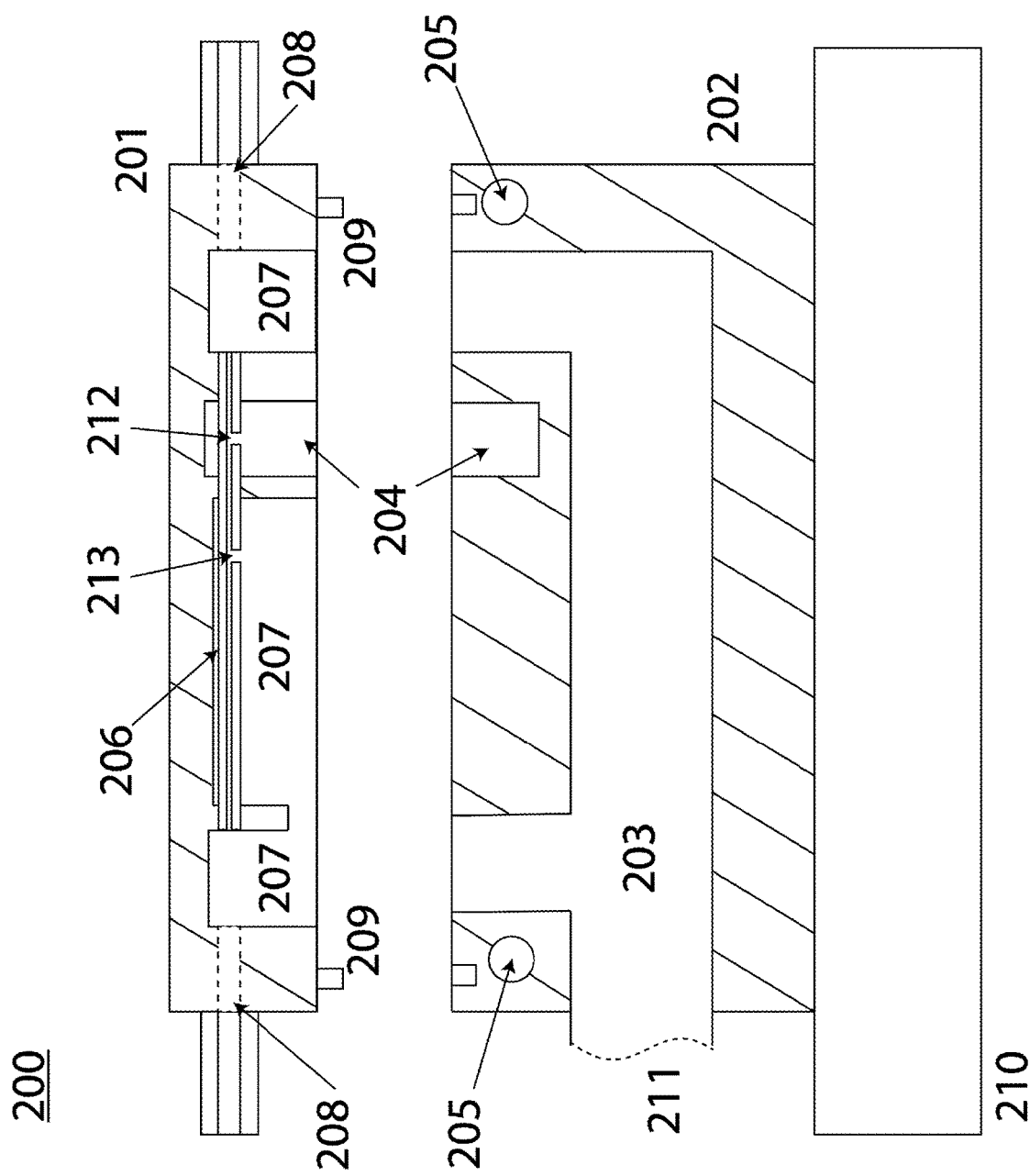
FIG. 2 is a side cross-sectional view of the fixed HHG fiber cartridge of FIG. 1.
Figure 4:
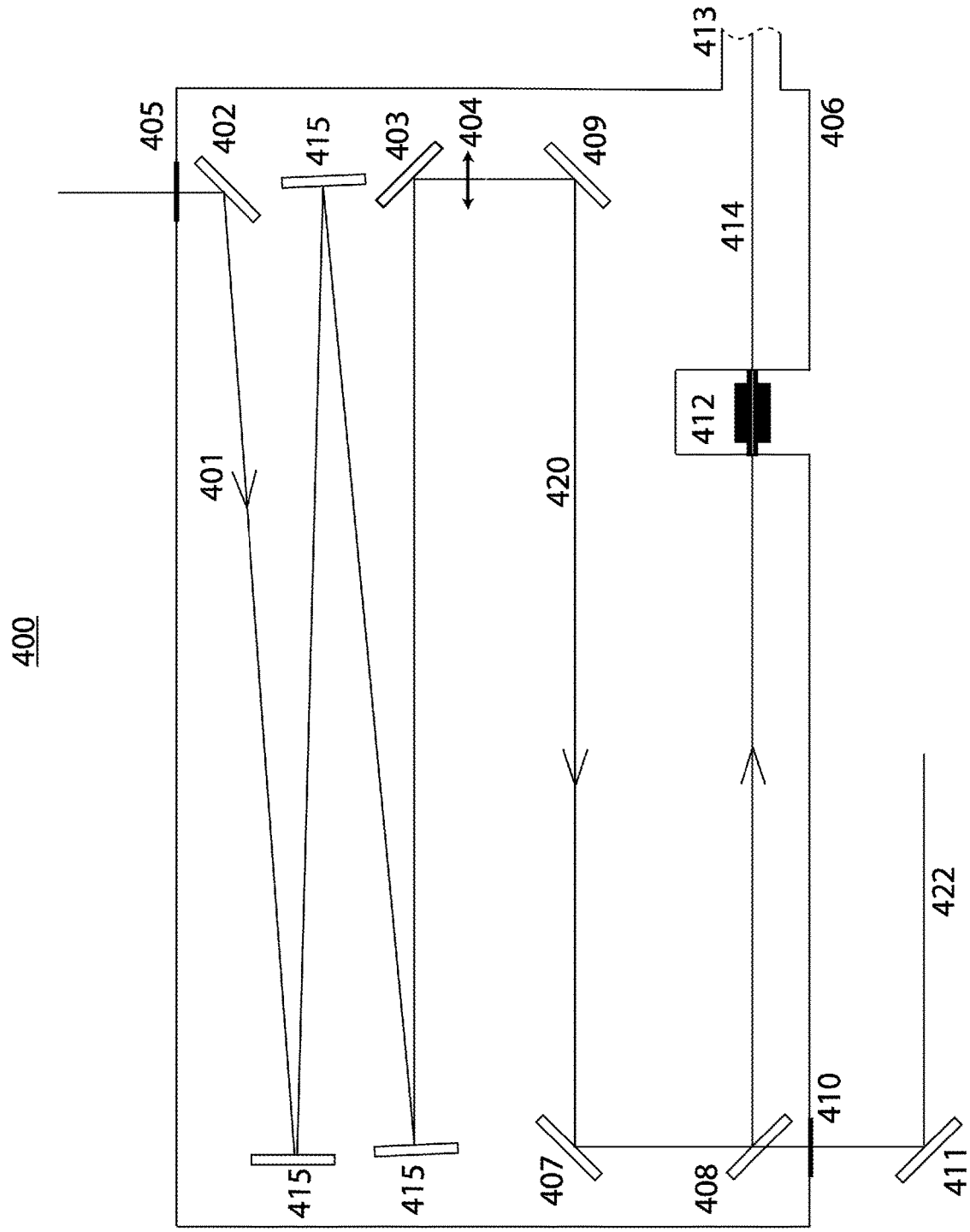
FIG. 4 is a schematic block diagram of a second embodiment of a HHG system in operation, in which most components are enclosed in the vacuum chamber.
Figure 5A:
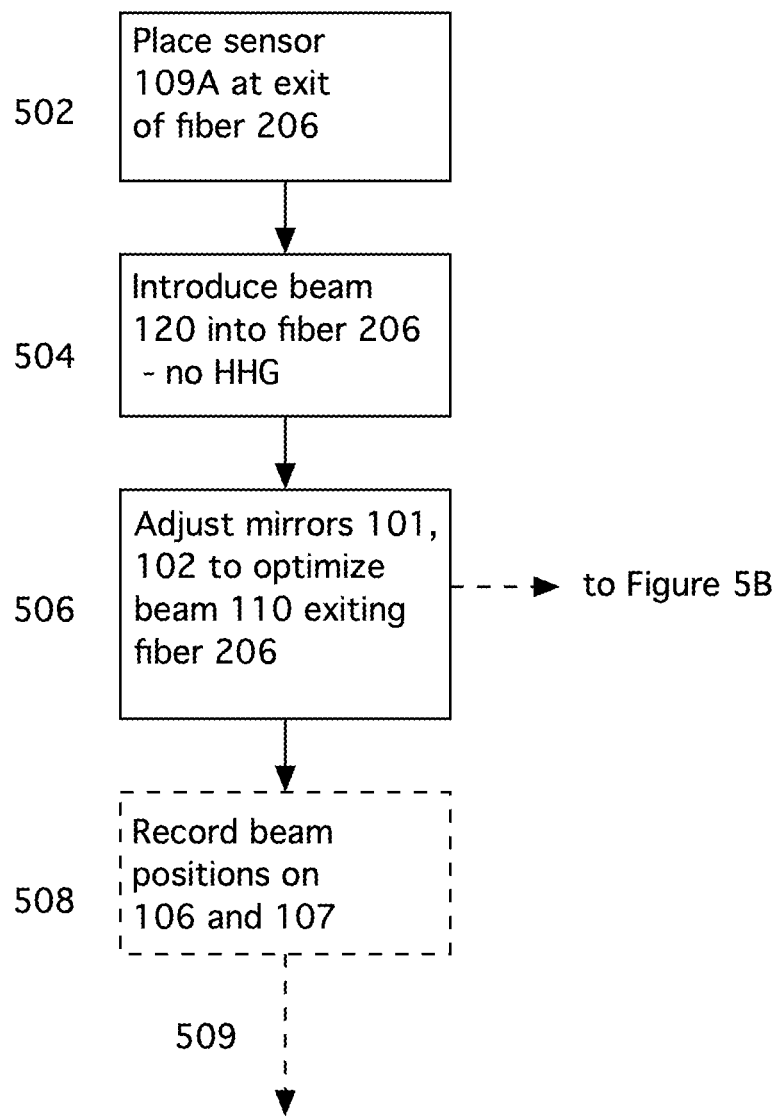
FIGS. 5A-C are flow diagrams illustrating embodiments of the processes for initial alignment, HHG alignment, and continuous alignment during operation according to the present invention.
Figure 5B:
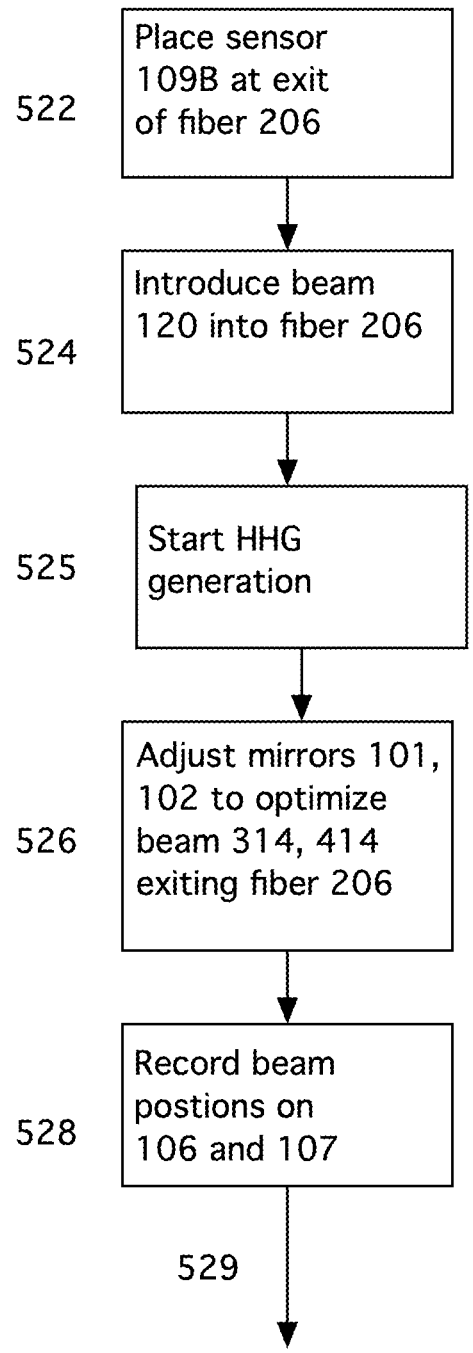

FIG. 1 is a schematic block diagram of an HHG system 100 including a fixed HHG fiber cartridge 103 (see FIG. 2). System 100 is configured for initial alignment. FIG. 5A shows the process of initial alignment with a sensor 109A, while FIG. 5B shows the process of fine-tuning alignment for HHG optimization alignment with sensor 109B. Since the same diagram is used for both processes, 109 and 110 are used in this section. See FIGS. 5A-5C and accompanying description for details Sensor 109 is used to monitor various characteristics of initial output beam 110, and is removed in use (when initial beam 110 becomes the system HHG output 314, 414. Sensors 106 and 107 are used in initial alignments, and also help maintain alignment when the system is in use (see FIGS. 3 and 4).

Laser beam 105 passes through waveplate 111, polarizing element 112, and focusing element 113 to ensure the desired polarization and intensity of the light 120 into HHG cartridge 103. Beam 105 is directed via electronically actuatable mirrors 101, 102 and focused by focusing element 113 to become beam 120 which enters HHG fiber cartridge 103 (shown in detail in FIG. 2). Light 110 is output and sensed by initial alignment sensor 109.

Processor 104 controls (for example) piezo-actuated mirrors 101 and 102, as well as waveplate 111, and interfaces with operating sensors 106 and 107, and initial alignment sensor 109. Processor 104 adjusts these elements to align laser beam 120 with HHG fiber 206 (see FIG. 2) within HHG fiber cartridge 103 and, at the same time, to optimize output 110B. Proper alignment requires both the correct position of the focused beam at the entrance to the fiber, and a direction of the focused beam collinear with the axis of the fiber.

Mirrors 101 and 102, controlled by processor 104, are used to align driving laser beam 120 with HHG fiber 206 within fiber cartridge 103. Sensor 109 measures various aspects of output beam 110 and provides feedback to processor 104. Sensor 109 may measure spectrum, position, shape, power, pointing stability, and power stability of beam 110. Alignment system 101, 102, 104 achieves three tasks: a) it aligns beam 105 to a reference consisting of a previously-recorded beam position in the far field at sensor 107 and a previously-recorded beam position in the near field at sensor 106. This in turn aligns beam 120 with fiber 206. This reference point set unambiguously describes a unique beam path. b) It modifies the direction of the beam pointing about an arbitrarily selected pivot point. c) It translates the beam, parallel to itself, without changing the direction that the beam is pointing. These three aspects of beam alignment are all that is required to co-align the IR laser beam 120 with HHG fiber cartridge 103 and subsequently optimize the quality of the generated beam 110. Assembly of all these components onto a rigid, temperature controlled, platform allows the position of the sensor system 106-108 to remain fixed relative to fiber cartridge 103 when the system is operating.

Driving laser beam 120 power is optionally stabilized using polarization-based attenuation. Waveplate 111 is adjusted by processor 104 for this purpose, to control the amount of light rejected by polarizing element 112. Sensors 106 and 107 monitor fluence to sense the power of driving laser beam 120 by sensing monitoring beam 122 and provide feedback to processor 104. They can also sense beam 120 position. Sensors 106, 107 might comprise monochrome cameras, quadrant detectors, lateral-effect detectors, or color sensitive cameras. One might be placed at a focus of laser input 120 in addition to providing feedback to processor 104 to align beam 120. Beam splitter 108 sends some percentage of monitoring signal 122 to sensor 107 and the rest to sensor 106 concurrently. 114 is a sampling mirror, designed to reflect most of light 120 and allow monitoring signal 122 to be transmitted. 114 typically reflects >99%, however that remaining <1% monitoring signal 122 is sufficient to be used for diagnostics by sensors 106, 107.

Waveplate 111 might be actuated by being attached to a motorized rotation stage, or it might be a liquid crystal-based variable waveplate or other electrically-actuated polarization modulation.

Referring to both FIG. 1 and FIG. 2, beam 120 in the apparatus is aligned first manually, and subsequently using actuatable mirrors 101 and 102. Proper adjustment requires that the focal spot size, the position of the focus at the entrance to the HHG assembly 200, and the direction of beam propagation, be matched the cartridge 103 fiber 206. In manual alignment, this can be done through inspection of the mode of the driving laser emerging from the waveguide as beam 110, which in ideal case will look very much like the beam entering the waveguide, in mode-shape direction and divergence (see FIG. 5A). Once the proper alignment of the waveguide fiber 206 is obtained, the beam positions on sensors 106 and 107 then define this reference position (generally sensor 107 is placed at the beam focus) and direction (106). By using a transfer matrix formalism and manual or automatic sensitivity calibration, the effect of x-y adjustments on mirrors 101 and 102 on signals sensed at sensors 106 and 107 can be characterized, allowing for feedback control by processor 104 of position through standard PID or other stabilization methodologies.

From time-to-time, the waveguide cartridge 201 will need replacement. This assembly can be manufactured to tolerances that allow for the system to maintain its overall alignment without manual realignment of the optical system described above, or with very minimal alignment. This has been found to be a key improvement for overall utility of the generated radiation: it ideally emerges from the apparatus without change in position, direction, or divergence to allow for consistent downstream alignment.

FIG. 2 is a side cross-sectional view of an embodiment of fixed waveguide cartridge 201 and attached gas distribution block 202, forming HHG waveguide assembly 200. Waveguide cartridge 201 and gas distribution block 202 are fixed into position with respect to each other with (for example) registration pin locators 209 extending from Waveguide cartridge 201 into gas distribution block 202. The high harmonic generation occurs within HHG fiber 206.

In one embodiment, gas distribution block 202 is fixed to a system baseplate 210 and waveguide cartridge 201 is affixed to gas distribution block 202. Actuatable mirrors 101, 102 are also fixed with respect to HHG waveguide assembly 200 in operation, for example by being held by mounts (not shown) also attached to baseplate 210.

HHG occurs in a hollow core fiber waveguide 206 wherein laser light 120 is confined to a pressure controlled gaseous interaction region. HHG assembly 200 (the combination of waveguide cartridge 201 and gas distribution block 202) is configured to control gas pressure throughout the interaction between the laser light and the gas medium. It also controls temperature via fluid (generally water) cooling channels 205.

Gas is supplied through gas inlet channel 204. Gas distribution block 202 includes large aperture gas outlet channel 203 communicating with differential pumping chambers 207 to maximize conductance of gas away from HHG fiber 206 to vacuum pump/s (not shown). 212 is an inlet channel into fiber 206, and 213 is an outlet channel from fiber 205 configured to implement differential pumping. Small aperture channels 208 are positioned at either side of waveguide cartridge 201, to further implement differential pumping. Channels 208 further reduce gas pressure, both before and after HHG cartridge 201.

HHG waveguide cartridges 201 are designed to be replaced by end users once they reach the end of their life, without requiring the end user to realign the input beam 120. High accuracy manufacturing processes such as wire-EDM are advisable. Replacing a HHG waveguide cartridge 201 also does not require disconnecting and reconnecting waveguide cartridge 201 gas inlet channel 204 and differential pumping chambers 207 as they are aligned to gas outlet channel 203 in attached gas distribution box 202.

The cartridge 201 mounting geometry of FIG. 2 corresponds to an optimal geometry to confine a high gas pressure inside a waveguide, while allowing a laser beam to enter and exit from a relatively low-pressure vacuum environment; i.e. "differential pumping." This setup avoids nonlinear instabilities at the entrance, and re-absorption of the generated light at the exit. Generally, the geometry of the waveguide corresponds to a diameter of −100-500 µm, and an overall length of ~<1-10 cm. The gas used for high-order harmonic generation is typically a rare gas; i.e. He, Ne, Ar, Kr, Xe, although molecular gasses can also be used in special cases. The pressure in the waveguide can be optimized by observing the converted flux, and can vary from >>10 atm (typical for helium gas) to <10 torr (Kr, Xe). The optimum flux results from a combination of phase-matching conditions in the waveguide, and re-absorption of the generated light after exiting the waveguide.

The specific construction of the fiber mounting of FIG. 2 is not critical, but balances optical absorption, heat conductivity, and thermal expansion matching to the waveguide material itself in a particularly useful manner. Generally, it is been found that high thermal conductivity is preferred in actively cooled geometries, while thermal expansion matching is more important when not as aggressively cooled.

Figure 3:
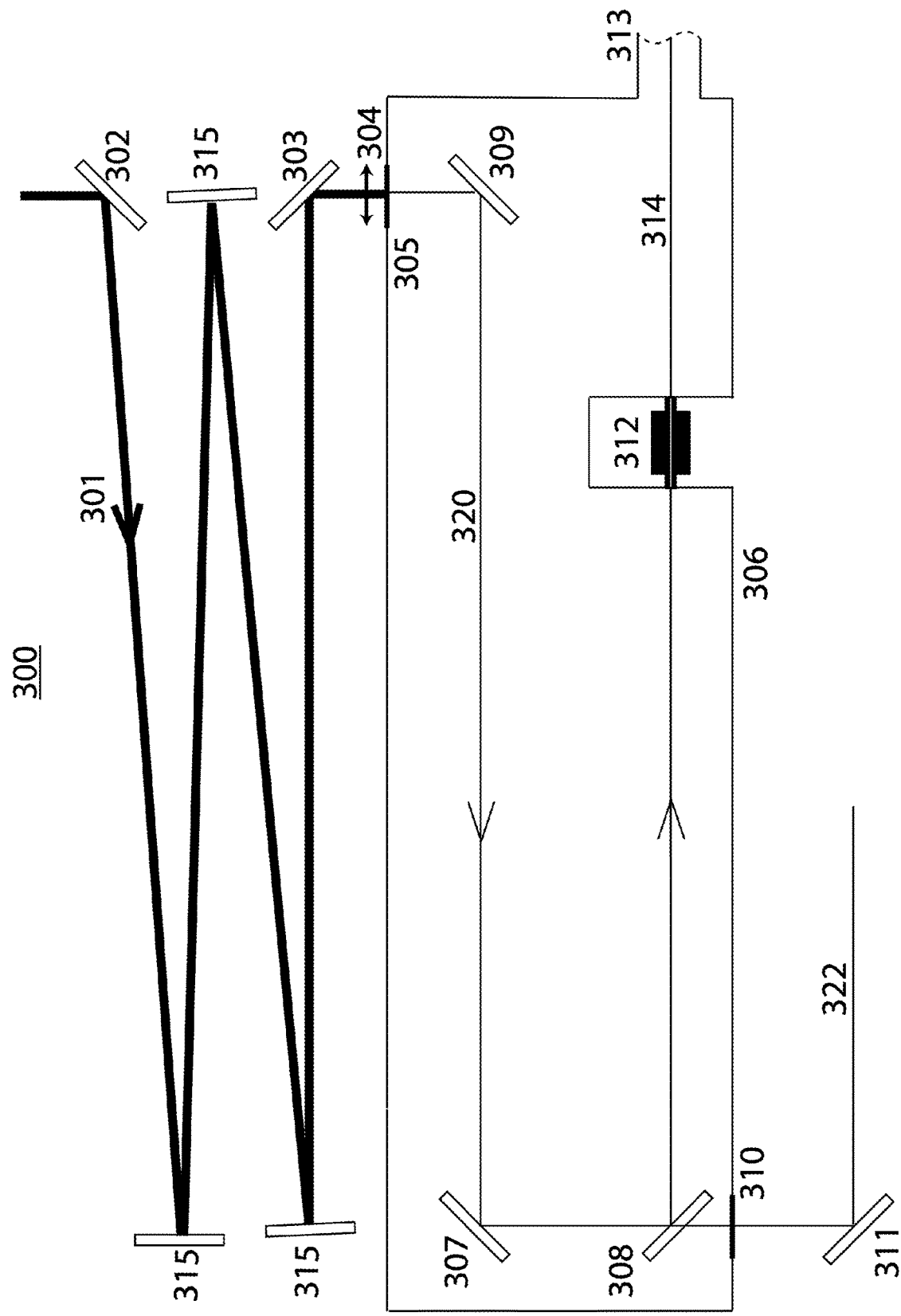
FIG. 3 is a schematic block diagram of a first embodiment of a HHG system in operation, in which a large beam size is used up until the focusing optic, where after it is introduced to a vacuum chamber.

FIG. 3 is a schematic block diagram of a first embodiment 300 of an operating HHG system similar to that shown in FIG. 1. FIG. 4 is a second embodiment 400 Note that the embodiments of FIGS. 1, 3, and 4 are examples, and features of each embodiment may be used in the others. For example, waveplate 111 and polarizing element 112 may be used to form polarized input beams 301, 401 and also to attenuate input beams 301, 401 under the control of processor 104. Similarly, portions of the FIG. 1 configuration may be placed within a vacuum chamber.

The subsystem consisting of operating sensors 106, 107, processor 104, sampling mirror 114, and beam splitter 108 is used to compensate for any drift in beam 105, 301, 401 position pointing caused by the input laser or environmental factors. The amount of drift that can be compensated for depends on a combination of how much mirrors 101,102, 302,303,402,403 can actuate and the distance in between the two actuatable mirrors. For the most suitable actuatable mirrors for this application, it has been found that ~2 meters in-between the actuatable mirrors is useful, allowing compensation for a reasonable amount of drift. To keep the footprint small, fold mirrors 315, 415 can be used to make up the 2 meters. Those skilled in the art will appreciate that the specific optical elements and distances will vary depending on configuration.

It has been found that 2 meters of propagation in air causes problems, so the specific embodiments of FIGS. 3 and 4 account for that issue in two different ways: 300 uses a large cross-section beam during the folding, while FIG. 4 places the folding elements within vacuum chamber 406.

In the embodiment of FIG. 3, the beam 301 propagates with a large cross-sectional area until the focusing optic 304, after which the beam 320 is introduced to vacuum chamber 306 while also maintaining the functionality of the alignment system of FIG. 1. A large beam 301 (size calculated to ensure ~1-3 m of propagation in air maintaining B-integral <<1) is aligned via actuating mirrors 302 and 303 (analogous to mirrors 101,102) to the focusing optic 304. Shortly after 304, the focusing beam enters a vacuum chamber 306, via a window 305. Mirrors 302 and 303 are actuatable as per mirrors 101 and 102 in FIG. 1. Directing mirrors 307, 308 and 309 deliver the focusing beam 320 to the HHG fiber cartridge 312. These directing mirrors are optional, but provide the means to make the footprint of the device more compact. It has been determined that in the overall system, the B-integral from atmospheric propagation is generally the most serious constraint on stability of the output, while a setup as shown in FIG. 3 can maintain a fluence on mirrors 307-9 that avoids nonlinear effects or damage. The generated high harmonics 314 exit the vacuum chamber 306 through the vacuum port 313, to the output vacuum beamline. Leak-through monitoring light 322 passing through beam splitting mirror 308 also exits the vacuum chamber via window 310 and can be used to maintain alignment as per FIG. 1, elements 106, 107 and 108.

FIG. 4 is a schematic block diagram of a second embodiment 400 of an operating HHG system in which folding components 415 as well as actuating mirrors 402 and 403 are enclosed in vacuum chamber 406. Beam 401 size is not required to be as large as beam 301 was, because the in-air propagation distance from the laser which generates beam 301 to HHG fiber cartridge 412 has been reduced, due to actuatable mirrors 402, 403 and folding mirrors 415 being inside of vacuum chamber 406. Mirrors 407-409 operate similarly to mirrors 307-309 in device 300. Similarly 404 is a focusing element, 405 is an entrance window, 408 is a beam splitter, 410 is an exit window, and 411 is a mirror used to provide sampled monitored light 422 to sensors 106, 107. 413 is the output to the vacuum beamline.

Figure 5C:
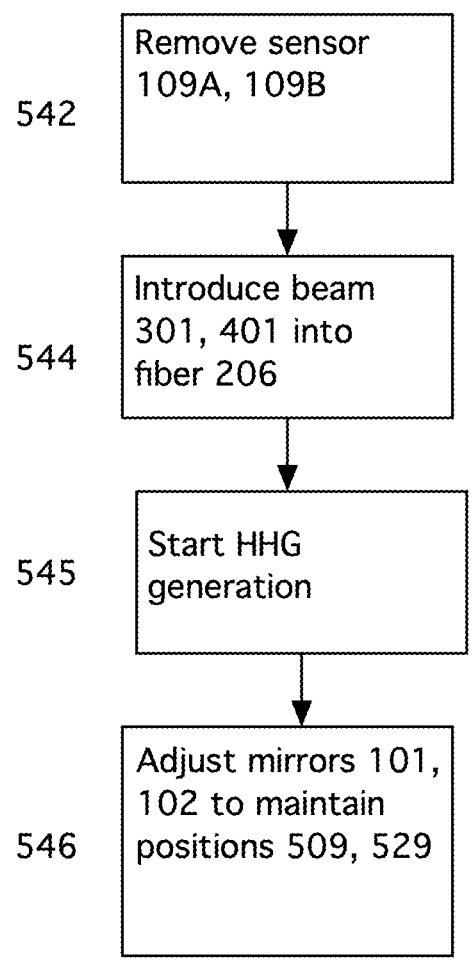

FIGS. 5A, 5B, and 5C illustrate processes of initial alignment, HHG optimization, and operation according the present invention. In general initial alignment 5A will be performed first, HHG optimization will fine tune alignment, and operation proceeds as in FIG. 5C. In some cases process 5A and/or 5B might be skipped if the alignment is already sufficient.

FIG. 5A is a flow diagram illustrating the process of initial alignment Initial alignment sensor 109A is placed after the exit of fiber 206 to sense the laser beam output 100A in steps 502. A lower power laser beam 120 is used in step 504 such that HHG does not occur. Next, mirrors 101 and 102 are actuated in order to optimize beam 110A in step 506. At this point the beam positions 509 at operating beam sensors 106 and 107 may be recorded in step 508 if process 5B is not performed.

FIG. 5B is a flow diagram illustrating the process of HHG optimization. Sensor 109A has been removed and initial alignment sensor 109B is inserted after the exit of fiber 206. The power of beam 120 is increased to generate HHG beam 110B. Sensor 109B senses 110B and monitors it for various characteristics while processor 104 adjusts actuatable mirrors 101, 102 until HHG beam 110B is of sufficient quality. Then, the position of beams 529 at operating beam sensors 106, and 107 are recorded.

FIG. 5C is the process in operation. Sensors 109A, 109B are removed in step 542. Input laser beam 301, 401 is introduced in step 544 and power is increased to generate HHG if necessary in step 545. Actuatable mirrors 101, 102 are adjusted as needed during operation (step 546) to ensure that positions 509 and 529 on operating beam sensors 106, and 107 are maintained. This, in turn, ensures that beam 301, 401 is properly oriented with respect to fiber 206.

While the exemplary preferred embodiments of the present invention are described herein with particularity, those skilled in the art will appreciate various changes, additions, and applications other than those specifically mentioned, which are within the spirit of this invention.

What is claimed is:

1. An apparatus for high harmonic generation (HHG) comprising:
   a polarized ultrashort pulse laser source;
   an HHG assembly comprising a gas distribution block and a waveguide cartridge having a HHG hollow core waveguide, the waveguide cartridge removeably attached to the gas distribution block, and the gas distribution block configured to maintain a pressure profile within the HHG hollow core waveguide;
   two operating beam sensors;
   two actuatable mirrors, and a processor configured to communicate with the operating beam sensors and automatically and repeatedly adjust the actuatable mirrors while the apparatus is operating such that a beam from the ultrashort pulse laser source is directed into the HHG hollow core waveguide;
   wherein the HHG assembly is fixed in place with respect to the two operating beam sensors during operation.

2. The apparatus of claim 1 further comprising:
   an initial alignment sensor configured to be placed at an output of the HHG hollow core waveguide during an initial alignment process and removed before operation, the initial alignment sensor configured to sense a sample beam exiting the HHG hollow core waveguide;
   wherein the processor is further configured to adjust the actuatable mirrors to optimize the sample beam and to record sample beam position on the operating beam sensors; and
   wherein during operation the processor is configured to adjust the actuatable mirrors such that the recorded beam positions are maintained.

3. The apparatus of claim 1 further comprising:
   an HHG sensor configured to be placed at the output of the HHG hollow core waveguide during an HHG optimization process and removed before operation, the HHG sensor configured to sense an HHG beam exiting the HHG hollow core waveguide;
   wherein the processor is further configured to adjust the actuatable mirrors to optimize the HHG beam and to record HHG beam position on the operating beam sensors; and
   wherein during operation the processor is configured to adjust the actuatable mirrors such that the recorded beam positions are maintained.

4. The apparatus of claim 1 further comprising:
   an initial alignment sensor configured to be placed at an output of the HHG hollow core waveguide during an initial alignment process and removed before operation, the initial alignment sensor configured to sense a sample beam exiting the HHG hollow core waveguide;
   wherein the processor is further configured to adjust the actuatable mirrors to optimize the sample beam; and
   an HHG sensor configured to be placed at the output of the HHG hollow core waveguide during an HHG optimization process and removed before operation, the HHG sensor configured to sense an HHG beam exiting the HHG hollow core waveguide;
   wherein the processor is further configured to adjust the actuatable mirrors to optimize the HHG beam and to record HHG beam position on the operating beam sensors; and
   wherein during operation the processor is configured to adjust the actuatable mirrors such that the recorded beam positions are maintained.

5. The apparatus of claim 1 wherein the gas distribution block is configured to provide a pressure profile within the HHG hollow core waveguide wherein the pressure in an interaction region of the HHG hollow core waveguide is on the order of 100 times the pressure in a noninteraction region of the HHG hollow core waveguide.

6. The apparatus of claim 5 wherein the gas distribution block and the HHG hollow core waveguide cartridge are held in position with respect to each other using a mechanical registration mechanism.

7. The apparatus of claim 5 wherein the gas distribution block includes channels configured to cool the HHG hollow core waveguide with fluid.

8. The apparatus of claim 1 further comprising a polarizing mechanism controlled by the processor and configured to attenuate the beam from the ultrashort pulse laser source.

9. The apparatus of claim 1, further comprising a series of folding mirrors disposed optically between the two actuatable mirrors and a focusing element disposed optically after the actuating mirrors and the folding mirrors.

10. The apparatus of claim 9, further comprising a vacuum chamber configured to contain the actuatable mirrors and the folding mirrors.

11. The apparatus of claim 9 wherein the beam from the ultrashort pulse laser source is configured to have a larger cross section before the actuating mirrors and the folding mirrors and a smaller cross section after the focusing element.

12. A method of high harmonic generation (HHG) comprising the steps of:
   providing an HHG assembly comprising a gas distribution block and a waveguide cartridge having a HHG hollow core waveguide, the HHG hollow core waveguide cartridge removeably attached to the gas distribution block, and the gas distribution block configured to maintain a pressure profile within the HHG hollow core waveguide;
   providing two operating beam sensors;
   providing two actuatable mirrors,
   fixing the operating beam sensors in place with respect to the HHG assembly;
   providing predetermined beam positions on each of the operating beam sensors;
   providing a polarized ultrashort pulse laser beam configured to cause HHG within the HHG assembly;
   sensing operating beam positions of the laser beam with the operating beam sensors; and
   automatically and repeatedly adjusting the actuatable mirrors such that the operating beam positions on each of the operating beam sensors matches the predetermined beam positions.

13. The method of claim 12 wherein the step of providing predetermined beam positions comprises the steps of:
   providing a polarized ultrashort pulse laser beam to the HHG assembly, the beam configured to not cause HHG within the HHG assembly;
   sensing a sample beam after the HHG assembly;
   adjusting the actuatable mirrors to optimize the sample beam; and recording the position of the beam on the operating beam sensors as the predetermined beam positions.

14. The method of claim 12 wherein the step of providing predetermined beam positions comprises the steps of:
providing a polarized ultrashort pulse laser beam to the HHG assembly, the beam configured to cause HHG within the HHG assembly;
sensing a sample beam after the HHG assembly;
adjusting the actuatable mirrors to optimize the sample beam; and
recording the position of the beam on the operating beam sensors as the predetermined beam positions.

15. The method of claim 12 wherein the step of providing predetermined beam positions comprises the steps of:
providing a polarized ultrashort pulse laser beam to the HHG assembly, the beam configured to not cause HHG within the HHG assembly;
sensing a sample beam after the HHG assembly;
adjusting the actuatable mirrors to optimize the sample beam;
providing a polarized ultrashort pulse laser beam to the HHG assembly, the beam configured to cause HHG within the HHG assembly;
sensing a sample beam after the HHG assembly;
adjusting the actuatable mirrors to optimize the sample beam; and
recording the position of the beam on the operating beam sensors as the predetermined beam positions.

16. The method of claim 12 further comprising the step of providing a pressure profile within the HHG hollow core waveguide wherein the pressure in an interaction region of the HHG hollow core waveguide is on the order of 100 times the pressure in a noninteraction region of the HHG hollow core waveguide with the gas distribution block.

17. The method of claim 12 further comprising the step of cooling the HHG hollow core waveguide with fluid flowing in channels in the gas distribution block.

* * * * *